Oct. 20, 1953   A. R. HELLWIG   2,656,181
VEHICLE SPRING REARCHING MEANS
Filed Dec. 26, 1950
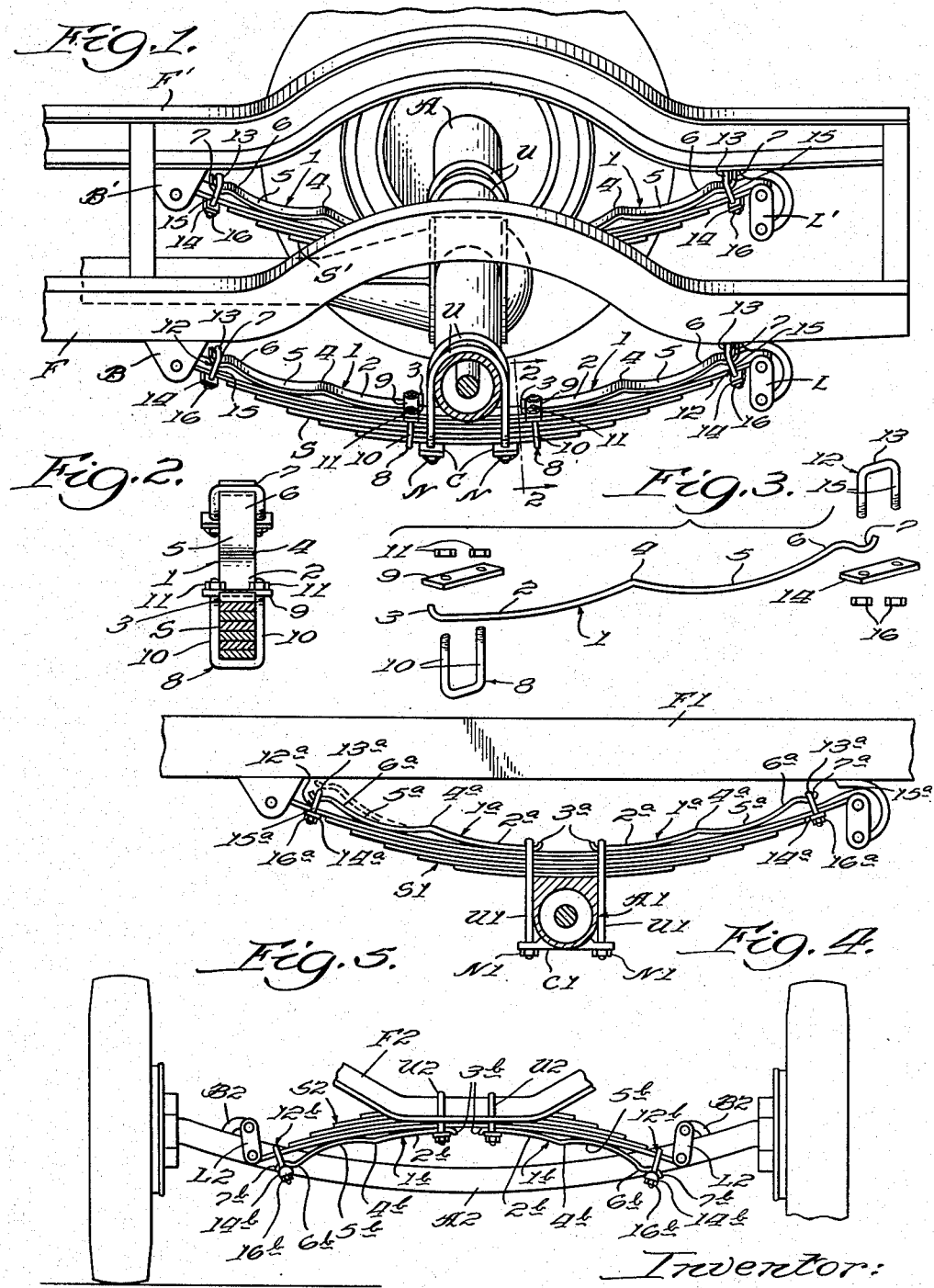
Inventor:
August R. Hellwig.
By Harold J. de Visconte
Atty.

Patented Oct. 20, 1953

2,656,181

UNITED STATES PATENT OFFICE 2,656,181

VEHICLE SPRING REARCHING MEANS

August R. Hellwig, Glendale, Calif.

Application December 26, 1950, Serial No. 202,593

9 Claims. (Cl. 267—48)

This invention relates to vehicle springs and particularly to an improved form of reinforcement for leaf type vehicle springs.

In many vehicles employing leaf type springs for mounting the body structure on the axles of the vehicle, it is desired to strengthen the springs so that heavier loads may be carried without danger of spring breakage or so that easier riding qualities may be realized under conditions of heavy load. Additionally, in some cases, the road conditions under which a vehicle is customarily used are such as to make the use of stiffer springs than those furnished as standard equipment desirable.

With the foregoing considerations in mind, it is an object of the present invention to provide a spring reinforcing and arch increasing means for leaf type vehicle springs which is so constructed and arranged as to be capable of attachment to many different forms of such springs.

Another object of the invention is to provide a reinforcing and arch increasing means for leaf type vehicle springs which may be adjustably stressed incident to installation with resultant variation in the riding qualities of the vehicle to suit the desires of individual drivers.

A further object of the invention is to provide a reinforcing and arch increasing means for leaf type vehicle springs which may be installed to operate within the path of movement of the spring to which it is attached.

Still another object of the invention is to provide a reinforcing and arch increasing means for leaf type vehicle springs which is simple in construction, economical to manufacture, easy to install, and reliable in use.

With the above objects in view, together with such additional objects and advantages as may subsequently appear, the invention resides in the parts, and in the construction, combination, and arrangement of parts disclosed, by way of example, in the following specification of certain representative modes of execution and application of the invention; reference being had to the accompanying drawings which form a part of said specification and in which drawings:

Fig. 1 is a fragmentary perspective view of the rear end of a vehicle chassis and springs showing the application of the invention to underslung springs, Fig. 2 is a sectional view taken on the line 2—2 of Fig. 1, Fig. 3 is an exploded view of the component parts of the invention for application to one end of a vehicle spring, Fig. 4 is a fragmentary side elevation of a vehicle chassis showing the application of the invention to a vehicle spring extending longitudinally of the vehicle and mounted on top of the vehicle axle, and Fig. 5 is a fragmentary end elevation of a vehicle chassis showing the application of the invention to vehicle springs disposed transversely to the vehicle.

Referring first to Figs. 1, 2 and 3, there is shown in Fig. 1 a vehicle chassis comprising an axle A and a frame structure including side members F and F' yieldingly mounted on the axle by a pair of semi-elliptic multiple leaf springs S and S' which springs at their mid points are secured to the underside of the axle A by pairs of U-bolts U, U which extend over the axle at each side of the spring and which beneath the spring are interconnected by cross bars C, C secured thereon by nuts N and thus clamp the spring to the underside of the axle A. The ends of the springs curve outwardly and upwardly and the forward ends of the springs are pivotally connected to brackets B and B' depending from the frame members F and F'', while the rear ends of the springs are connected to the frame members by shackle links L and L' to allow for longitudinal changes in the distance between the ends of the springs incident to flexing.

The invention comprises a spring steel bar 1 which is of substantially the same width as the vehicle spring on which it is used and preferably of the same or slightly greater thickness than the leaves comprising the vehicle spring. It comprises an anchor portion 2 having an outturned end 3 from which it curves outwardly in the same direction as the end 3 toward a point 4 at about the mid length of the bar at which point it is bent sharply at approximately an equal but opposite angle from which it extends in a long shallow curve 5 to the active end 6 terminating in a shallow U-bend 7 adapted to be connected to the spring in the manner to be later described.

To apply the bar to a vehicle spring of the type shown in Fig. 1, the bar is positioned on the top of the spring with the anchor portion thereof positioned adjacent the axle and it is clamped to the spring by a U-bolt 8 and its cross bar 9 which U-bolt extends around the spring assembly with the leg portions 10 thereof extending through holes in the cross bar and engaged by nuts 11 threaded thereon. As here shown, the cross bar extends across the face of the anchor portion of the bar 1 but it will be apparent that if it is found more convenient for access the U-bolt can be reversed with the cross bar positioned beneath the spring. The bar is so shaped that when thus clamped to the spring, the active end thereof will be positioned a considerable distance away from the end of the spring as indicated in dotted lines in Fig. 4. The active end of the bar is then sprung toward the spring until the mid point of the curved portion 5 of the bar contacts the spring and it is then secured to the end of the longest leaf only of the spring by a U-bolt 12, the center section 13 of which engages the U-bend 7 and the cross bar element 14 of which extends across the lower surface of the spring end and is secured on the legs 15 of the U-bolt by nuts 16. A second bar 1 is similarly attached to the opposite end of the spring and a corresponding pair of bars 1 is also attached to the other vehicle spring. As thus mounted, the active ends of the bars 1 exert forces opposing the load on the springs in addition to the resistance to that load offered by the springs. Also by drawing up on the nuts 16 and thus tending to straighten out the curved portion 5 of the bar and increasing the curvature or arch of the spring, the load resisting force exerted by the bars can be increased or by loosening up on these nuts this added force can be decreased. In this manner the load capacity of the vehicle can be variably increased to suit individual needs without excessive deflection of the vehicle springs or increase in the coefficient of friction between the leaves of the spring.

Referring next to Fig. 4 there is illustrated another common type of vehicle spring mounting with the reinforcing means of the present invention applied thereto. In this form of the invention, the spring S1 is mounted on top of the axle A1 and is secured thereto by a pair of U-bolts U1 which extend across the spring and along opposite sides of the axle and thence through a washer element C1 having four holes therethrough to be engaged by nuts N1 on the ends on the U-bolts. The resilient bars which comprise the invention are attached to the spring by having the anchor portion inserted beneath the center portions of the U-bolts U1 thus eliminating the U-bolts 12 employed in the first described form of the invention. These spring bars, here designated as 1a, reinforce the spring S1 in the same manner as in the first described form of the invention and consequently, all similar parts have been identified by the same numerals with the addition of the letter "a" and repetition of the mode of installation and of operation is omitted as being unnecessary.

In Fig. 5, the invention is shown applied to a transversely disposed spring such as is commonly used at the front end of vehicles. In the illustrated form, the spring S2 is inverted and is connected at both ends to the axle A2 by shackle links L2 which are in turn connected to bracket arms B2 carried by the axle. The center of the spring is connected to a cross member F2 of the vehicle frame by a pair of U-bolts U2, the cross bars C2 of which are employed to clamp the anchor portions 2b of the spring reinforcing bars 1b against the lower face of the spring S2. The mode of operation and of installation is similar to the previously described forms wherefore all similar parts of the invention are identified by the same numbers with the addition of the letter "b" while similar vehicle parts are identified by similar letters with the addition of the exponent "2."

While in the foregoing specification there have been disclosed certain embodiments of the invention, it is appreciated that still other adaptations of the principles of the invention will suggest themselves to others skilled in the art in the light of the above disclosure. Therefore, the invention is not to be limited to the exact forms so disclosed but it is to be understood that it includes all such modifications in the parts and in the construction, combination, and arrangement of parts as shall come within the purview of the appended claims.

I claim:

1. In a reinforcing means for a multiple leaf type of semi-elliptic vehicle spring a pair of spring metal bars each having one end thereof anchored to the concave side of the spring adjacent the mid-point of the spring and extending from their points of anchorage toward the opposite ends of the spring, respectively, and each of said bars terminating in a free end portion spaced from the end of the spring toward which it extends and intermediate its ends having a fulcrum-like portion engaging the concave side of the spring, and adjustable means operable to interconnect the free end of each of said bars with the complementary end of the longest leaf only of the spring with resultant creation of an increase in the arch and consequent load carrying capacity of the spring while maintaining substantially the original coefficient of friction between the spring leaves incident to flexure of the spring.

2. A reinforcing means for one end of a multiple leaf type of semi-elliptic vehicle spring comprising a spring metal bar of similar cross sectional shape to the cross sectional shape of the main leaf of the spring; said bar at one end thereof having an anchor point clamped to the concave side of the spring adjacent the mid-length of the spring and thence extending toward one end of the spring and terminating in a free end substantially parallel to but laterally spaced from the end of the spring; said bar between its ends being bent outwardly away from the side of the spring from the anchor point thereof and thence toward and into a fulcrum-like contact with the spring and thence outwardly to said free end, and a U-bolt means extending between said free end of said bar and the longest leaf only of the spring operable to draw said free end toward the spring with resultant increase in the arch and consequent load resisting bias of the reinforced end of the spring while maintaining substantially the original coefficient of friction between the spring leaves incident to flexure of the spring.

3. A spring reinforcing means for a vehicle including in combination an axle, a frame and a multiple leaf semi-elliptic spring interconnecting the axle and frame; said reinforcing means comprising a pair of flat spring metal bars each having one end thereof clamped to the concave side of the spring adjacent the mid length of the spring with said bars extending in opposite directions respectively toward opposite ends of the spring and terminating in free end portions spaced from the spring ends but contained in a plane containing the path of motion of the spring ends; each of said bars between its mid-length and said free end being shaped to provide a fulcrum-like contact the concave side of the spring and thence being bent outwardly away from the spring, and a pair of U-bolts each interconnecting one of the free ends of said bars and the complementary end of the longest leaf only of the spring operable to adjustably draw said free ends toward the spring with resultant creation of a bias in the bar in opposition the load responsive flexure of the spring and resultant increase in the arch and consequent load carrying capacity of the spring while maintaining substantially the original coefficient of friction between the spring leaves incident to flexure of the spring.

4. A spring reinforcing means for a vehicle including in combination an axle, a frame and a multiple leaf semi-elliptic spring arranged to yieldingly mount the frame on the axle; said reinforcing means comprising a spring metal bar similar in cross section to the cross section of the main leaf of the spring, means clamping one end of said bar to the concave side of the spring adjacent the mid-length thereof; said bar extending from said clamped end toward one end of the spring and terminating in a free end spaced from and disposed adjacent to one end of the spring; said bar being shaped to contact the concave side of the spring only at said first-named end and at a point between the mid-length of the bar and the free end thereof, a U-bolt embracing said free end of said bar and the end of the longest leaf only of the spring operable to adjustably draw said free end toward the spring end with resultant creation of an increased arch in the spring and a spring bias in the bar opposing the load responsive flexure of the spring, and a similar but oppositely disposed bar and U-bolt extending from the mid-length to the opposite end of the spring while maintaining substantially the original coefficient of friction between the spring leaves incident to flexure of the spring.

5. The combination with a multiple leaf type of semi-elliptic vehicle spring of reinforcing means; said means comprising a pair of spring metal bars similar in cross section to the cross section of the main leaf of said spring; means connecting one end of each of said bars to the concave side of said spring adjacent the mid-length of said spring with the bars extending toward opposite ends of said spring; said bars terminating in end portions spaced from said spring and each bar between its ends being bent to form a spring contacting point disposed between the free end thereof and the mid-length of said bar, and means adjustably connecting the free ends of the bars with the complementary ends of the longest leaf only of said spring and effective to create a bias in said bars opposing the load responsive flexure of said spring with resultant variable increase in the arch and consequent load carrying capacity of said spring while maintaining substantially the original coefficient of friction between the spring leaves incident to flexure of the spring.

6. In an arch increasing means for a multiple leaf type of semi-elliptic vehicle spring a pair of spring metal bars each having one end thereof anchored to the concave side of the spring adjacent the mid-point thereof and to extend from the point of anchorage toward the ends of the spring and each of said bars terminating in a free end portion spaced from the end of the spring toward which it extends and intermediate its ends having a portion engaging the concave side of the spring, and adjustable means operable to interconnect the free end of each of said bars with the complementary end of the longest leaf only of the spring with resultant creation of an increase in the load carrying capacity of the spring; said adjustable means comprising a pair of U-bolts one at the free end of each of said bars disposed with the center portion thereof engaging the outer face of the free end of the bar and with the leg portions extending along the sides of the bar and spring, each of said U-bolts having a cross bar member through which the leg portions thereof extend and a nut on each leg portion of each U-bolt operable to draw the U-bolt through said cross bar.

7. A spring arch increasing means for a vehicle including in combination an axle, a frame and a multiple leaf semi-elliptic spring interconnecting the axle and frame; said arch increasing means comprising a pair of flat spring metal bars each having one end thereof clamped to the concave side of the spring adjacent the mid-length thereof with said bars extending in opposite directions respectively toward opposite ends of the spring and terminating in free end portions spaced from the spring ends but contained in a plane containing the path of motion of the spring ends; each of said bars between its mid-length and said free end being shaped to contact the concave side of the spring and thence being bent outwardly away from the spring, and a pair of U-bolts each interconnecting one of the free ends of said bars and the complementary end of the longest leaf only of the spring operable to adjustably draw said free ends toward the spring with resultant creation of a bias in the bar in opposition the load responsive flexure of the spring and resultant increase in the arch and consequent load carrying capacity of the spring; the free ends of each of said bars having a shallow U-shaped bend extending transversely of the length of the bar and positioned with the concave side thereof on the side of the bar remote from the spring and adapted to be engaged by the U-bolt associated with that bar.

8. A spring arch increasing means for a vehicle including in combination an axle, a frame and a multiple leaf semi-elliptic spring interconnecting the axle and frame; said arch increasing means comprising a pair of flat spring metal bars each having one end thereof clamped to the concave side of the spring adjacent the mid-length thereof with said bars extending in opposite directions respectively toward opposite ends of the spring and terminating in free end portions spaced from the spring ends but contained in a plane containing the path of motion of the spring ends; each of said bars between its mid-length and said free end being shaped to contact the concave side of the spring and thence being bent outwardly away from the spring, and a pair of U-bolts each interconnecting one of the free ends of said bars and the complementary end of the longest leaf only of the spring operable to adjustably draw said free ends toward the spring with resultant creation of a bias in the bar in opposition the load responsive flexure of the spring and resultant increase in the arch and consequent load carrying capacity of the spring; the free end of each of said bars and the U-bolt associated therewith being so constructed and arranged as to hold the U-bolt against movement endwise of the spring and bar.

9. An arch increasing and reinforcing means for one end of a multiple leaf type of semi-elliptic vehicle spring comprising a spring metal bar of similar cross sectional shape to the cross sectional shape of the main leaf of the spring; said bar at one end thereof having an anchor point clamped to the concave side of the spring adjacent the mid-length thereof and thence extending toward one end of the spring and terminating in a free and substantially parallel to but laterally spaced from the end of the spring; said bar between its ends being bent outwardly away from the side of the spring from the anchor point thereof and thence toward and into contact with the spring and thence outwardly to said free end, and a U-bolt means extending between said free end of said bar and the outer end of the longest leaf only of the spring operable to draw said free end toward the spring leaf with the resultant increase in the arch and consequent load resisting bias of the reinforced end of the spring; the free end of said bar having a transversely disposed depression engaged by the center portion of said U-bolt and effective to prevent movement of said U-bolt lengthwise of the spring leaf.

AUGUST R. HELLWIG.

References Cited in the file of this patent

UNITED STATES PATENTS

| Number | Name | Date |
|---|---|---|
| 1,835,134 | Bernhardt | Dec. 8, 1931 |
| 2,205,086 | Dell | June 18, 1940 |